(12) United States Patent
Brown et al.

(10) Patent No.: US 10,578,635 B2
(45) Date of Patent: Mar. 3, 2020

(54) METHOD FOR ASSESSING A ROTATIONAL SPEED OF AN ENGINE

(71) Applicant: Schneider Electric Industries SAS, Rueil-Malmaison (FR)

(72) Inventors: David R Brown, League City, TX (US); Shuai Wu, Rueil Malmaison (FR); Gerard Gomez, Le Broc (FR)

(73) Assignee: Schneider Electric Industries SAS, Rueil-Malmaison (FR)

( * ) Notice: Subject to any disclaimer, the term of this patent is extended or adjusted under 35 U.S.C. 154(b) by 350 days.

(21) Appl. No.: 15/606,865

(22) Filed: May 26, 2017

(65) Prior Publication Data
US 2017/0343575 A1    Nov. 30, 2017

(30) Foreign Application Priority Data

May 27, 2016    (EP) .................................... 16305612

(51) Int. Cl.
*G01P 3/48*        (2006.01)
*G01P 3/481*       (2006.01)
*G01P 21/02*       (2006.01)
*G01P 3/489*       (2006.01)

(52) U.S. Cl.
CPC .......... *G01P 3/4815* (2013.01); *G01P 3/4807* (2013.01); *G01P 3/489* (2013.01); *G01P 21/02* (2013.01); *G01P 3/4802* (2013.01)

(58) Field of Classification Search
CPC .. G01P 1/07; G01P 1/106; G01P 1/122; G01P 3/46; G01P 3/488; G01P 3/489; G01P 13/045; G01P 15/00
See application file for complete search history.

(56) References Cited

U.S. PATENT DOCUMENTS

| | | | |
|---|---|---|---|
| 4,434,470 A | 2/1984 | Thomas et al. | |
| 5,517,962 A * | 5/1996 | Ling | F02P 9/005 |
| | | | 123/335 |
| 5,541,859 A | 7/1996 | Inoue et al. | |
| 2003/0208329 A1 | 11/2003 | Brown et al. | |
| 2004/0158422 A1 | 8/2004 | Brown et al. | |
| 2007/0216326 A1 * | 9/2007 | Sako | H02P 25/145 |
| | | | 318/268 |
| 2008/0110283 A1 | 5/2008 | Shaver et al. | |

FOREIGN PATENT DOCUMENTS

EP    2 172 785 A1    4/2010

OTHER PUBLICATIONS

Extended European Search Report dated Nov. 30, 2016 in European application 16305612.0, filed on May 27, 2016 (with Written Opinion).
Ralf Schwarz et al. "Increasing Signal Accuracy of Automotive Wheel-Speed Sensors by On-line Learning," Proceedings of the American Control Conference, Jun. 1997, pp. 5.

* cited by examiner

*Primary Examiner* — Tung X Nguyen
(74) *Attorney, Agent, or Firm* — Oblon, McClelland, Maier & Neustadt, L.L.P.

(57) ABSTRACT

A method assesses the rotational speed of a machine, and more particularly the rotational speed of a rotating equipment prime mover controlled by a governor. Such machines include turbo machinery and relate to a measurement device for measuring speed. The method measures a number of pulses during a measurement interval, determines a portion of a pulse pattern, determines an integration period, and calculates the rotational speed based on the portion of the pulse pattern.

14 Claims, 4 Drawing Sheets

METHOD FOR ASSESSING A ROTATIONAL SPEED OF AN ENGINE

The present invention relates to a measurement device and method for assessing the rotational speed of a machine, and more particular to assessing the rotational speed of a rotating equipment prime mover controlled by a governor.

BACKGROUND

Rotating equipment prime movers are devices that may convert one form of available energy into a particular source of continuous rotational power or motion. The rotational power produced by the prime mover is then put to use by driving another energy conversion device. Examples of rotating equipment prime movers include turbines, such as for wind, gas, steam, or water, reciprocating engines, such as for gasoline, diesel, or natural gas, and electric motors, both ac and dc, that are used to turn drive trains, generators, pumps, or compressors.

Such rotating equipment prime movers are usually equipped with a governor, a rotational velocity i.e. speed limiting and control device, to manipulate the rotational speed and preferably keep the output of the prime mover at a constant level. The governor is provided with feedback from the prime mover, which may include energy output, rotational speed, angular torque or other parameters.

One particular way of measuring the rotational speed of the prime mover includes a reference gear having a specific number of teeth and a sensor that detects the teeth passing by and delivers a pulse signal for each detection. The rotational speed may then be determined in terms of frequency by dividing the number of pulses by the measurement interval, the time interval during which a number of pulses is detected:

$$F\ [Hz] = \frac{X_{pulses}}{T_{interval}}$$

The accuracy of this approach mainly depends on the accuracy of determining the time duration of the measurement interval. The length of the measurement interval influences the accuracy of the measurement, but also the delay time of feedback to the governor. A longer interval increases accuracy, but increases the delay time for feedback. For an engine running at low speed a long measurement interval is required to get a valid measurement, whereas for engines running at high speed a short delay time for feedback is required to control the engine at a constant speed.

A further problem is that for certain engines, such as reciprocating engines, the angular velocity is not constant, e.g. with a stroke of the engine the angular velocity will first accelerate and decelerate thereafter.

Some prior art solutions address this by adapting the manner of calculation to the speed of the engine. For example, by introducing a threshold to select between calculating the speed based on one pulse-to-pulse delay or calculating the speed by averaging over multiple pulse-to-pulse delays. Though this allows to increase accuracy at high speed, it may show variations between consecutive calculations due to the variations in angular velocity. Other prior art solutions therefore measure the speed with an increased measurement interval, despite that this delays the feedback to the governor.

SUMMARY OF INVENTION

It is an object of the invention to overcome the disadvantages of the prior art. This is achieved by providing a method that measures a number of pulses during a measurement interval, determines a portion of a pulse pattern, determines an integration period, and calculates the rotational speed based on the portion of the pulse pattern.

According to another aspect, there is provided a measurement device carrying out the above method.

Determining which portion of a rotational movement pattern of a rotation of a reference gear is represented by a measurement, allows to compensate for variations in angular velocity of the engine. As prior art solutions measure the rotational speed based only on measurements representing a fraction of the rotational movement of the reference gear, consecutive measurement samples may show variations that reflect the variation in angular velocity but not the speed of the engine when actually running at a constant speed of rotations per minute (RPM).

BRIEF DESCRIPTION OF THE DRAWINGS

By way of example only, the embodiments of the present disclosure will be described with reference to the accompanying drawing, wherein.

DETAILED DESCRIPTION

Figure 1:
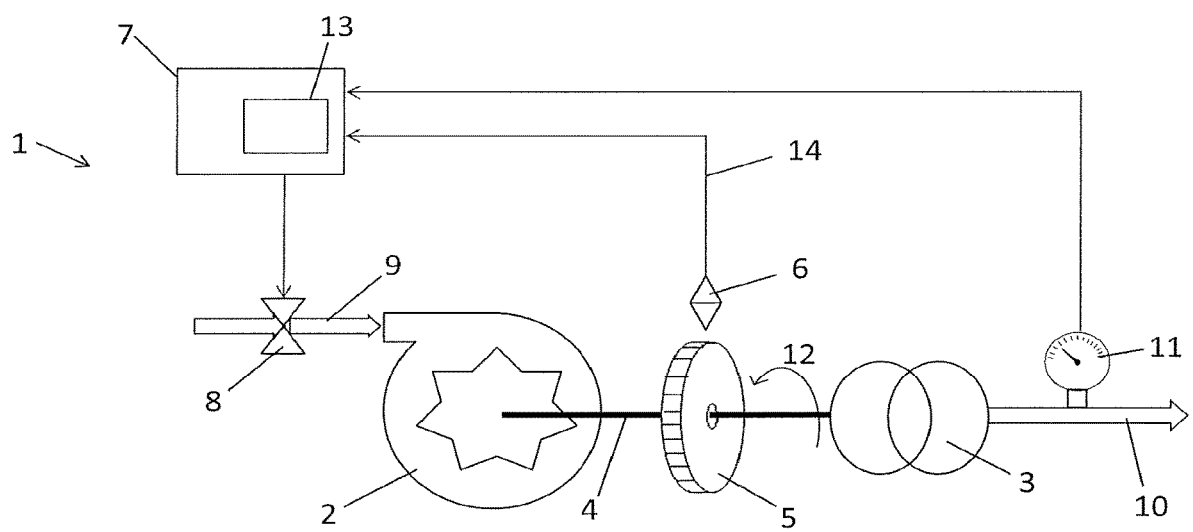
FIG. 1 illustrates schematically an example of an engine with a speed governor.

Shown in FIG. 1, is an example of an engine 1 with a prime mover 2 driving a piece of rotating equipment 3 via a drive axis 4. The engine 1 further has a reference gear 5, a sensor 6 and a governor 7. The reference gear 5 is equipped with teeth and mounted on the drive axis 4. The sensor 6 is arranged for detecting teeth of the rotating reference gear 5 passing by and delivering a pulse to the governor 7 for each instance of detection. The governor 7 is in turn connected to a valve 8. The valve 8 is arranged for controlling the supply of an energy source 9 to the prime mover 2. In this example, the prime mover 2 may be a diesel engine to be supplied with diesel as energy source. The supply of diesel 9 will run the prime mover 2 which in turn will drive the rotary equipment 3 via the drive axis 4. The reference gear 5 will rotate in the same direction, as indicated by arrow 12 and at the same speed as the prime mover 2 and allows to feedback the rotational speed to the governor 7.

The output 10 delivered by the rotating equipment 3 may be measured by a meter 11 to be fed back to the governor 7 and taken also in account for controlling the energy supply 9 via the valve 8.

Figure 2:
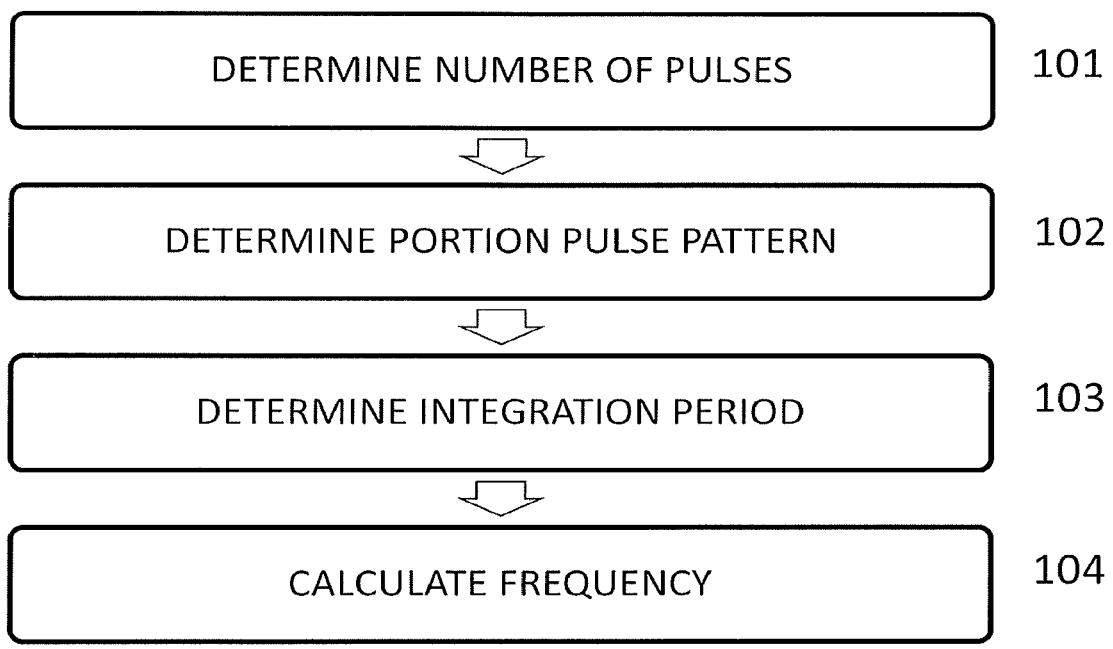
FIG. 2 is a flow diagram illustrating an example of a method in accordance with the invention.

The governor 7 is provided with a measurement device 13 configured for performing a method for assessing a rotational speed of an engine. Turning to FIG. 2, an example of such method for assessing the rotational speed of the engine 2 of FIG. 1 is shown. The method requires measuring 101 a number of pulses X during a measurement interval, determining 102 a portion of a pulse pattern, determining 103 an integration period, and calculating 104 the rotational speed based on the portion of the pulse pattern.

The sensor 6 detects the teeth of the gear passing by and provides an input signal 14 consisting of pulses for each detection. The pulses delivered by the sensor 6 may be measured 101 by a pulse counter which counts the number of pulses. A time counter may measure the time delay between consecutive pulses. And the pulse index of each pulse is also monitored.

When an engine starts running the measurements may start immediately. As the reference gear 5 has a fixed number of teeth which is known to the governor 7, each incoming pulse can be assigned a pulse index number, running from one to the number of teeth M. On completing one full rotation of the reference gear 5, the next pulse corresponds to the first pulse index again. This allows to acquire a pulse pattern of the reference gear 5 by storing the time proportional delay for each pulse index. Hence, for pulse index number two, the time proportional delay between the first pulse and the second pulse is stored. In this embodiment the acquired pulse pattern is stored in a pattern type table, which initial measurement may in general be referred to as a learning phase. In other embodiments the pattern type table may be provided in advance by the manufacturer of the engine. A full rotation of the reference gear 5 may take several measurement intervals i.e. sampling periods of the pulse counter. Depending on the structure of engine, e.g. the number of cylinders, a pulse pattern may correspond to one revolution or several revolutions of the reference gear 5. The pattern table will thus contain time delays for pulse indices for N pulses, with N equal to the number of teeth M on the reference gear, or a multiple thereof, like 2*M, 3*M, or 4*M. In order to determine 102 the portion of the pulse pattern the incoming measured pulses are compared against the stored pulses of the pattern type table. In one embodiment, this may be done by comparing the pulse indices and selecting the portion that matches the index of the measured pulses. In another embodiment, this may be done by comparing the consecutive time delays against the proportional time delays of the pattern type table and then selecting the portion matching that matches the measured pulses.

Selection of the portion based on the indices of the pulses requires the pulse counter to be synchronised with the pulse pattern table. Which is readily obtained when the learning phase has preceded the phase in which the measurements are used by the governor. If the pulse pattern table is supplied by the manufacturer, synchronization of the pulse counter with the start index of the pulse pattern table may be required.

Selection of the portion based on comparison of consecutive pulses does not require synchronization of the pulse counter and the pulse pattern table, but instead results in the portion being selected by identifying the consecutive pulse indices of which the proportional time delays match the measured pulses.

Either way, based on the pulses X and time delays of the corresponding pulse indices a corrective value Portion is calculated as the ratio of N pulses of the full pattern divided by the sum of the total time delay of the full pattern and the received pulses X divided by the sum of the time delays of the corresponding pulse indices. As shown in the Formula below:

$$\text{Portion} = \frac{\frac{N_{Pulses}}{T_{N_{pulses}}}}{\frac{X_{Pulses}}{T_{X_{pulses}}}} = \frac{N_{pulses}}{X_{pulses}} \times \frac{T_{X_{pulses}}}{T_{N_{pulses}}}$$

In other words, the corrective value Portion is the ratio of the average speed of pulses N of a full pattern and the relative speed of pulses X.

The integration period may be determined 103 from the sampling period, i.e. the period during which pulses were measured, and the time delay from the last measured pulse till the end of the sampling period. This method is known from European Patent EP 2172785 B1, granted to Schneider Electric on Mar. 16, 2016. The method disclosed therein allows to determine more accurately the period of the measurement interval during which pulses were received. In particular, it deducts the time from the last detected pulse till the end of the sampling period and adds the corresponding time interval of the previous sampling period.

With the number of pulses measured in the measurement interval, the portion of the pulse pattern and the integration period available, the rotational speed of the engine may be calculated 104 as a frequency based on the portion of the pulse pattern. By taking the formula:

$$F \text{ [Hz]} = \frac{X_{pulses} * \text{Portion}}{T_{integration}}$$

Herein, $X_{pulses}$ is the number of pulses X measured. $T_{integration}$ is the time of the measurement interval. And Portion is the corrective value as described above.

Figure 3:
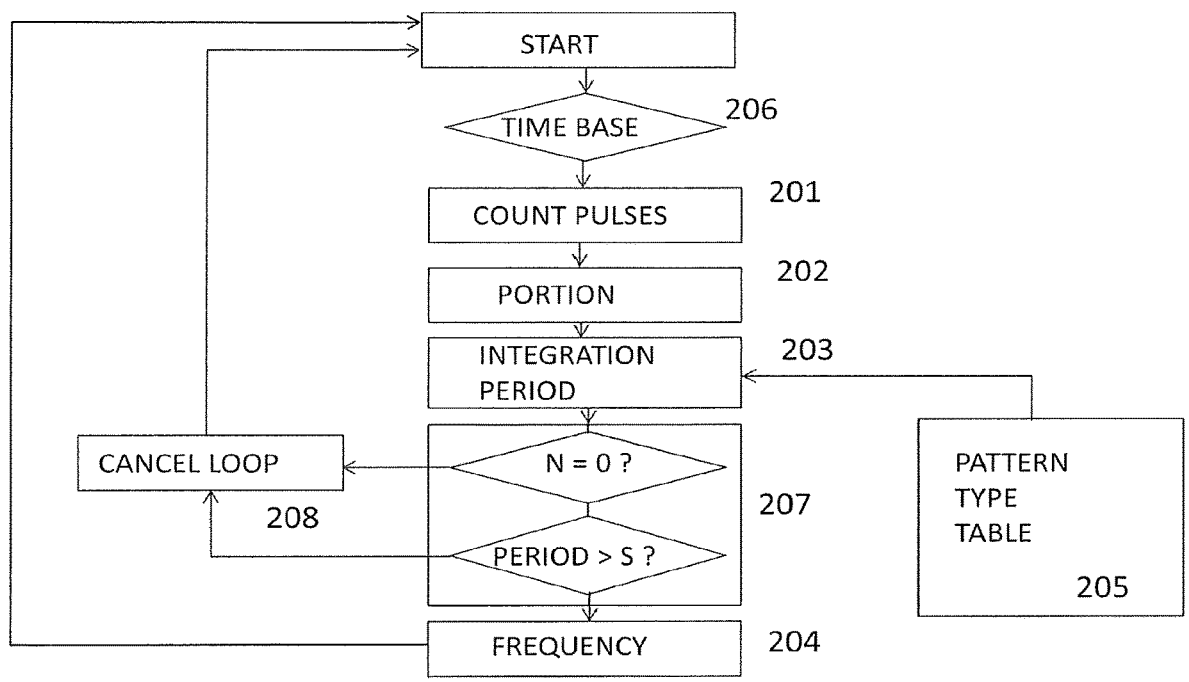
FIG. 3 is a flowchart illustrating a further example of a method in accordance with the invention.

Turning to FIG. 3, a flowchart is shown illustrating an example of the method in more detail. The method includes measuring 201 a number of pulses X during a measurement interval, determining 202 a portion of a pulse pattern, determining 203 an integration period, and calculating 204 the rotational speed based on the portion of the pulse pattern. And the method further includes providing a pattern type table 205, triggering 206 a measurement interval through a clock signal from a time base generator, and verifying 207 the size of the integration period.

As described above, a pattern type table may be provided 205 in advance by the manufacturer of the engine. Or it may be provided by storing the measurements obtained when the engine is started, i.e. during the learning phase. The learning phase is preferably performed when the engine is running at normal operational speed. Preferably, the load of the engine is kept stable during the learning phase, so the engine may be running more or less at constant speed to allow capturing a pulse pattern representative of the engine. The learning phase will only take a few revolutions to capture and store the pulse pattern.

A time base generator may be used to provide a clock signal for triggering 206 the measurement interval. This time base determines the length of the measurement interval, which due to its' periodic nature may also be referred to as a sampling period.

When the engine is running at low frequencies, e.g. less than 60 revolutions per minute, it could be that no pulse is delivered by the sensor in the measurement interval as the reference gear is rotating equally slow. It may also be that the integration period does not meet the expected accuracy, which may e.g. happen when the integration period becomes less than half of the sampling period. Or, for example, when the frequency of the engine lies between two and three times the sampling rate, the integration period may fluctuate between half and less than once the sampling rate. The higher the ratio between frequency and sampling rate, the closer the integration period will be in size to the sampling period. Which optimises the potentially achievable accuracy.

Hence, to guarantee the accuracy of the calculation, the size of the integration period needs to be verified 207. And the integration period needs to be extended 208 if no pulse was measured or if the integration period is less than a predetermined threshold. For example, to obtain an accuracy of 0.005% of error or more, the integration period must be greater than 20000 times the system clock period.

Figure 4:
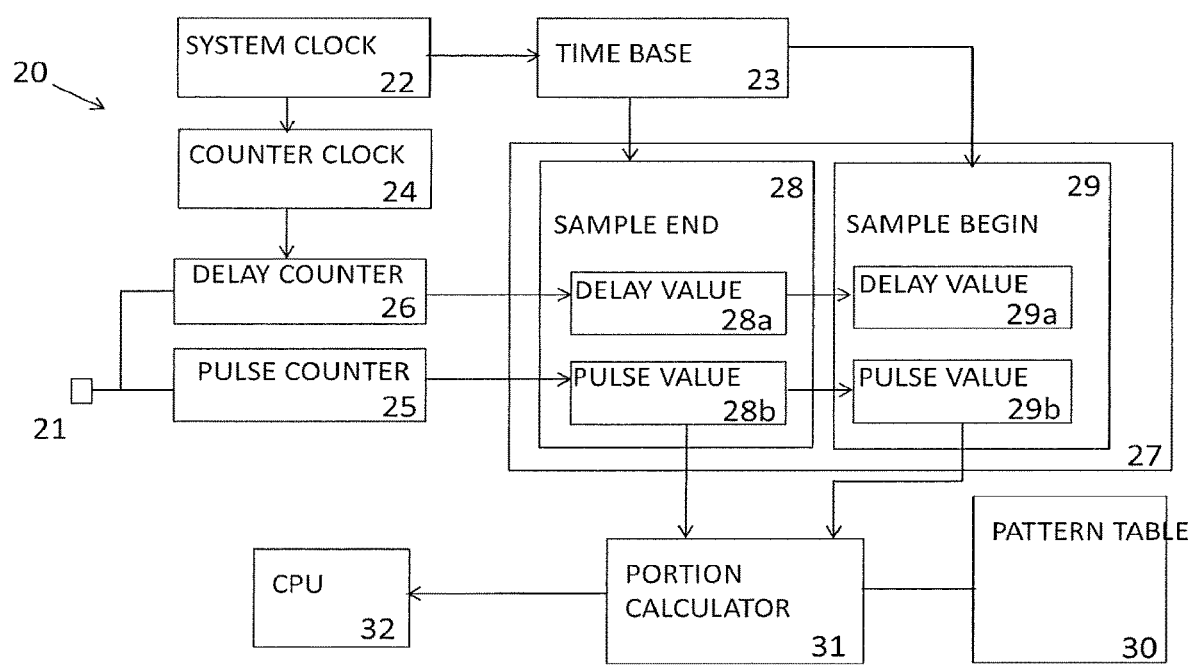
FIG. 4 is a block diagram schematically illustrating an example of a measurement device in accordance with the invention.

Referring to FIG. 4, a measurement device 20 for measuring a rotational speed of an engine is shown. The measurement device includes an input port 21 for an input signal. The measurement device further including: A system clock 22 providing a system clock signal. A time base generator 23 determining a sampling period derived from the system clock signal. A counter clock 24 providing a counter clock signal derived from the system clock signal. An input pulse counter 25 counting pulses of the input signal during a sampling period and keeping track of an index of the input pulses. A time counter 26 counting pulses of the counter clock 24 between two consecutive pulses of the input signal. And a latching memory 27 for capturing and storing the index of a value of the input pulse counter and a value of the time counter at an end of the sampling period of both a current sample period and a previous sample period.

The latching memory 27 may comprise two pairs of latching registries 28 and 29. Each pair 28, 29 consists of two latching registries 28a, 28b & 29a, 29b for storing the values for the pulse index and the pulse delay. One pair 29 will store the values of the previous measurement interval, which may be referred to as "sample begin". The other pair 28 will store the values of the current measurement interval, which may be referred to as "sample end".

In the embodiment of FIG. 4 the time base generator 23 and the counter clock 24 derive their signal frequency from the system clock 22. The signal frequency of the time base generator 23 determines when measurements are updated. The signal frequency of the counter clock 24 relative to the signal frequency of the time base generator 23 determines the accuracy of the measurement. For example, for an accuracy of 0.005% the frequency of the counter clock 24 must be 20000 times higher than the frequency of the time base generator 23.

The measurement device 20 may further include a pattern type table 30. The pattern type table 30 holding at least one pulse pattern of a series of pulse indices and a proportional delay for each of the pulse indices. The measurement device may further include a portion calculator 31 for comparing the stored pulse indices of the latching memory 27 against the pulse pattern table and calculating the portion of the pulse pattern from the proportional delays associated with the stored pulse indices of the latching memory 27.

The measurement device 20 may further include a processing unit 32. The processing unit 32 being arranged for calculating the number of pulses by subtracting the pulse index stored of the previous sample period from the pulse index stored of the current sample period. Further arranged for calculating an integration period from the sampling period, the proportional delay of the pulse index stored for the previous sample period and the proportional delay of the pulse index stored for the current sample period. And arranged for calculating the frequency of the rotational speed from the number of pulses, the portion of the pulse pattern and the integration period.

In another embodiment, the processing unit 32 of the measurement device 20 may also be arranged for performing the function of the portion calculator 31. Hence, no separate hardware for portion calculator 31 is present.

Although the present invention has been described above with reference to specific embodiments, it is not intended to be limited to the specific form set forth herein. Rather, the invention is limited only by the accompanying claims and, other embodiments than the specific above are equally possible within the scope of these appended claims.

Furthermore, although exemplary embodiments have been described above in some exemplary combination of components and/or functions, it should be appreciated that, alternative embodiments may be provided by different combinations of members and/or functions without departing from the scope of the present disclosure. In addition, it is specifically contemplated that a particular feature described, either individually or as part of an embodiment, can be combined with other individually described features, or parts of other embodiments.

The invention claimed is:

1. A method for assessing a rotational speed of an engine, comprising:
measuring a number of pulses during a measurement interval;
providing at least one stored pulse pattern;
determining a portion of the stored pulse pattern by comparing the measured pulses against the stored pulse pattern, and selecting the portion of the stored pulse pattern that matches the measured pulses;
determining an integration period; and
calculating the rotational speed based on the determined portion of the stored pulse pattern.

2. The method according to claim 1, further comprising:
providing a pulse pattern table, the table comprising the at least one pulse pattern.

3. The method according to claim 2, wherein the determining the portion of the stored pulse pattern further comprises:
calculating a corrective value based on the selected portion of the stored pulse pattern.

4. The method according to claim 1, further comprising:
triggering a measurement interval through a clock signal from a time base generator.

5. The method according to claim 1, wherein the calculating the rotational speed comprises the formula:

$$F \text{ [Hz]} = \frac{X_{pulses} * \text{Portion}}{T_{integration}}.$$

6. The method according to claim 1, further comprising:
evaluating a size of the integration period.

7. The method according to claim 6, wherein the evaluating the size of the integration period is performed between two measurement intervals.

8. The method according to claim 6, wherein the evaluating the size of the integration period comprises at least one of:
extending the integration period when the number of pulses measured in the measurement interval equals zero; and
extending the integration period when the size of the integration period is less than a predetermined threshold.

9. The method according to claim 8, wherein the predetermined threshold is half of a sampling period.

10. A measurement device for measuring a rotational speed of an engine, comprising:
a system clock providing a system clock signal;

a time base generator determining a sampling period derived from the system clock signal;

a counter clock providing a counter clock signal derived from the system clock signal;

an input pulse counter counting pulses of the input signal during sampling period and keeping track of an index of the input pulses;

a time counter counting pulses of the counter clock between two consecutive pulses of the input signal; and a latching memory for capturing and storing the index of a value of the input pulse counter and a value of the time counter at an end of the sampling period of both a current sample period and a previous sample period.

11. The measurement device according to claim 10, further comprising:

a pulse pattern table comprising at least one pulse pattern of a series of pulse indices and a proportional delay for each of the pulse indices; and a portion calculator comparing the stored pulse indices of the latching memory against the pulse pattern table and calculating the portion of the pulse pattern from the proportional delays associated with the stored pulse indices of the latching memory.

12. The measurement device according to claim 10, further comprising:

a processing unit arranged for:

calculating the number of pulses by subtracting the pulse index stored of the previous sample period from the pulse index stored of the current sample period;

calculating an integration period from the sampling period, the proportional delay of the pulse index stored for the previous sample period and the proportional delay of the pulse index stored for the current sample period; and calculating the frequency of the rotational speed from the number of pulses, the portion of the pulse pattern and the integration period.

13. A speed governor comprising the measurement device according to claim 10.

14. A rotary equipment prime mover comprising the measurement device according to claim 10.

* * * * *